United States Patent
Van De Sluis et al.

(10) Patent No.: US 10,154,561 B2
(45) Date of Patent: Dec. 11, 2018

(54) IMAGE BASED LIGHTING CONTROL

(71) Applicant: PHILIPS LIGHTING HOLDING B.V., Eindhoven (NL)

(72) Inventors: Bartel Marinus Van De Sluis, Eindhoven (NL); Tim Dekker, Eindhoven (NL); Berent Willem Meerbeek, Veldhoven (NL); Bas Driesen, Weert (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/775,029

(22) PCT Filed: Nov. 2, 2016

(86) PCT No.: PCT/EP2016/076371
§ 371 (c)(1),
(2) Date: May 10, 2018

(87) PCT Pub. No.: WO2017/080879
PCT Pub. Date: May 18, 2017

(65) Prior Publication Data
US 2018/0279440 A1   Sep. 27, 2018

(30) Foreign Application Priority Data
Nov. 11, 2015 (EP) .................... 15194038
Nov. 19, 2015 (EP) .................... 15195412

(51) Int. Cl.
*H05B 33/08* (2006.01)
*H05B 37/02* (2006.01)
*G06T 7/90* (2017.01)

(52) U.S. Cl.
CPC ........... *H05B 33/0863* (2013.01); *G06T 7/90* (2017.01); *G06T 2207/10024* (2013.01); *H05B 37/0272* (2013.01)

(58) Field of Classification Search
CPC .. H05B 33/0863; H05B 37/0272; G06T 7/90; G06T 2207/10024
USPC ........................................... 315/130
See application file for complete search history.

(56) References Cited

U.S. PATENT DOCUMENTS

| | | | |
|---|---|---|---|
| 7,550,931 B2 | 6/2009 | Lys et al. | |
| 2009/0122086 A1* | 5/2009 | Diederiks | H05B 37/02 345/690 |
| 2013/0271004 A1 | 10/2013 | Min et al. | |
| 2015/0022123 A1 | 1/2015 | Van De Sluis et al. | |

FOREIGN PATENT DOCUMENTS

WO       2011124933 A1    10/2011

* cited by examiner

Primary Examiner — Daniel D Chang
(74) Attorney, Agent, or Firm — Akarsh P. Belagodu

(57) ABSTRACT

A method implemented by a communication device for controlling light emitted from a linear lighting device comprising a plurality of linearly distributed controllable light sources, the method comprising: displaying an image on a display of the communication device; receiving an input indicating an area of the image; analyzing the image area to derive a sequence of colors; generating a control signal based on the derived 5 sequence of colors; and transmitting the control signal to the linear lighting device to control the plurality of controllable light sources to emit light in accordance with the derived sequence of colors.

8 Claims, 6 Drawing Sheets

IMAGE BASED LIGHTING CONTROL

CROSS-REFERENCE TO PRIOR APPLICATIONS

This application is the U.S. National Phase application under 35 U.S.C. § 371 of International Application No. PCT/EP2016/076371, filed on Nov. 2, 2016, which claims the benefit of European Patent Application No. 15194038.4, filed on Nov. 11, 2015 and European Patent Application No. 15195412.0, filed on Nov. 19, 2015. These applications are hereby incorporated by reference herein.

TECHNICAL FIELD

The present disclosure relates to image based lighting control. In particular, the present disclosure relates to image based lighting control of a linear lighting device.

BACKGROUND

The advent of connected lighting installations having many individually controllable light sources, luminaires, lighting arrangements and the like with advanced rendering capabilities, may be regarded as transforming lighting systems for both professional and consumer markets. This brings a need for an intuitive control capable of fully exploiting the rendering capabilities of the complete lighting infrastructure.

Image-based lighting uses color values of an image to light an environment. Image-based lighting enables easy creation of rich lighting scenes by exploiting the multitude of images that may be available to a user. Current solutions automatically extract the dominant colors from the image and assign them randomly to individual lighting devices in the lighting system.

SUMMARY

A linear lighting device with multiple light sources, such as a light emitting diode (LED) strip, can reproduce linear color patterns or segments from an image. The inventors have identified that users should be able to easily create and control such spatial or temporal light patterns, however such a linear lighting device requires a specific method to derive color values from the image content.

Aspects of the present disclosure relate to image based light scene creation for linear lighting devices.

According to one aspect of the present disclosure there is provided a method implemented by a communication device for controlling light emitted from a linear lighting device comprising a plurality of linearly distributed controllable light sources, the method comprising: displaying an image on a display of the communication device; receiving an input indicating an area of the image; analyzing the image area to derive a sequence of colors; generating a control signal based on the derived sequence of colors; and transmitting the control signal to the linear lighting device to control the plurality of controllable light sources to emit light in accordance with the derived sequence of colors.

The derived sequence of color values thus comprises multiple unique color values and the linear lighting device is controlled to emit the multiple unique color values.

The area may be a segment of the image. The input may be a user input. The user input may comprise a zoom instruction to zoom in on said segment of the image. The user input may comprise an instruction to draw a line on the displayed image, the line defining said segment of the image.

The user input may comprise an instruction to position a graphical representation of the linear lighting device over said segment of the image.

The input may comprise at least one sensor output signal indicative of the position of the linear lighting device in an environment, and the may method further comprise positioning a graphical representation of the linear lighting device over said segment of the image in dependence on the position of the linear lighting device in the environment.

The input may comprise at least one sensor output signal indicative of the orientation of the linear lighting device; and the method may further comprise controlling the orientation of the graphical representation of the linear lighting device in dependence on the orientation of the linear lighting device.

The input may comprise at least one signal indicative of the shape of the linear lighting device; and the method may further comprise controlling the shape of the graphical representation of the linear lighting device in dependence on the shape of the linear lighting device.

The method may further comprise: moving the graphical representation of the linear lighting device over the displayed image; during said movement, analyzing segments of the image defined by the graphical representation of the linear lighting device to derive a plurality of sequences of colors; generating a control signal based on the derived plurality of sequences of colors; and transmitting the control signal to the linear lighting device to control the plurality of controllable light sources to emit light in accordance with a dynamic lighting effect defined by the plurality of sequences of colors.

The method may further comprise moving the graphical representation of the linear lighting device over the displayed image in response to a user input.

The method may further comprise detecting movement of the linear lighting device based on at least one sensor output signal received from the linear lighting device, and moving the graphical representation of the linear lighting device over the displayed image in response to the detected movement.

The method may further comprise detecting a speed of said movement, and generating the control signal based on the detected speed to control a speed of the dynamic lighting effect.

The method may further comprise receiving an indication of a user-defined image area, and limiting said movement of the graphical representation of the linear lighting device to within said user-defined image area.

According to one aspect of the present disclosure there is provided a device for controlling light emitted from a linear lighting device comprising a plurality of linearly distributed controllable light sources, the device comprising: a communications interface; a display; and one or more processors configured to run a lighting control application, wherein the lighting control application is configured to: display an image on the display; receive an input indicating an area of the image; analyze the image area to derive a sequence of colors; generate a control signal based on the derived sequence of colors; and transmit the control signal via the communication interface to the linear lighting device to control the plurality of controllable light sources to emit light in accordance with the derived sequence of colors.

According to another aspect of the present disclosure there is provided a computer program product for controlling light emitted from a linear lighting device comprising a plurality of linearly distributed controllable light sources, the computer program product comprising code embodied on a computer-readable medium and being configured so as when executed on a processor to perform any of the methods described herein.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Embodiments will now be described by way of example only.

Figure 1A:
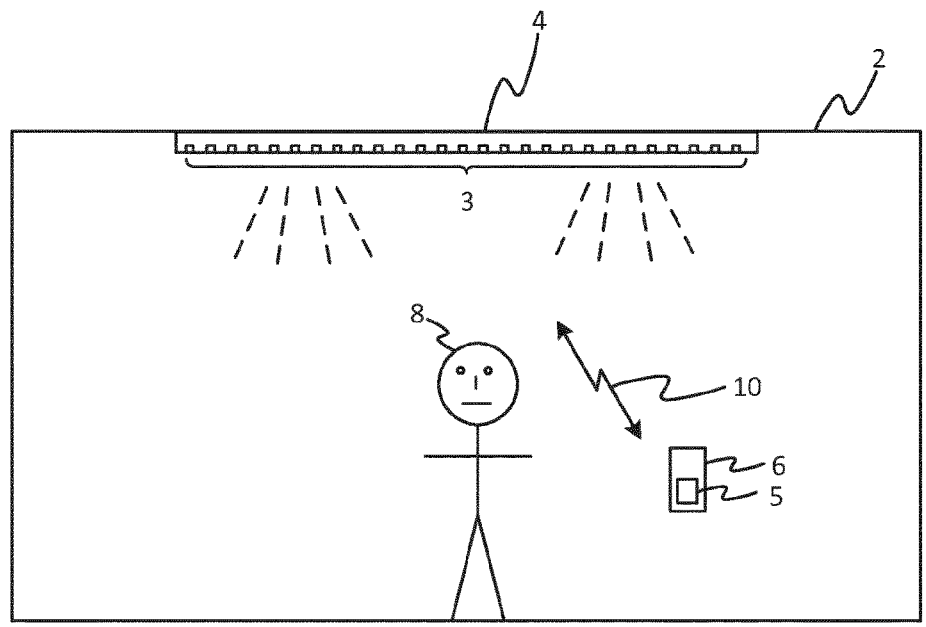
FIGS. 1a & 1b illustrates a schematic block diagram of a lighting system.
Figure 1B:
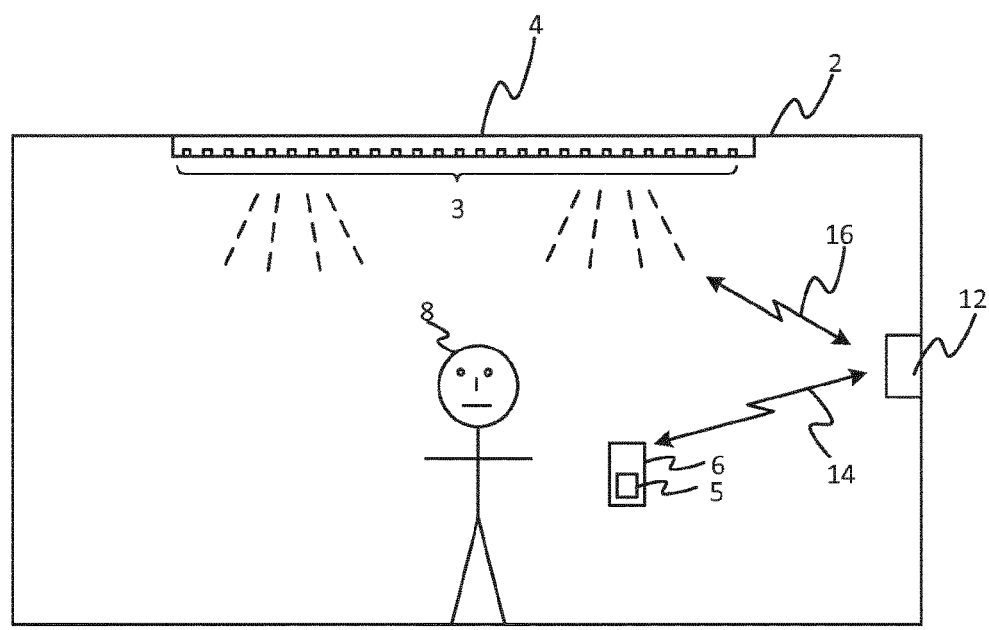

FIGS. 1a and 1b show examples of a lighting system comprising a linear lighting device 4. The lighting system is installed in an environment 2 which may comprise an indoor space such as a room or building, or an outdoor space such as a garden or park, or a partially-covered environment such as a gazebo or stadium, or any other type of environment such as the interior of a vehicle.

The linear lighting device 4 is a device for emitting illumination for illuminating the environment 2. The linear lighting device 4 comprises a plurality of light sources 3 plus any associated socket, housing and/or support.

The light sources 3 are controllable in that a light parameter (intensity, color, saturation, color temperature etc.) of the light emitted by the respective light source may be varied. The light sources 4a, 4b, 4c may comprise any suitable controllable source of light such as for example incandescent light sources, fluorescent light sources, inorganic/organic LEDs, in which case the linear lighting device 4 may be referred to as an "LED strip". A light source may be a single light source, or could comprise multiple light sources, e.g. multiple LEDs which may, for example, form an array of light sources collectively operating as a single light source. The lighting device 4 is referred to as being "linear" as the light sources 3 are linearly distributed (arranged such that they extend along a line) on the lighting device 4. The light sources 3 may be distributed evenly or unevenly over the length of the linear lighting device 4.

The linear lighting device 4 may be installed at fixed location within the environment 2 (e.g. in a ceiling, on a wall, or on light poles fixed to the floor or ground). Alternatively the linear lighting device 4 may be portable (e.g. positioned on a table).

The plurality of light sources 3 may be mounted on at least one traditional rigid printed circuit board such that the shape of the linear lighting device 4 cannot be varied. Alternatively, the plurality of light sources 3 may be mounted on at least one flexible printed circuit board such that the shape of the linear lighting device 4 can be varied, e.g. the linear lighting device 4 may take the form of a flexible LED strip. Thus the linear lighting device 4 may be bent, twisted, and in some cases (e.g. with textile based strips) even stretched.

In the case of a rectangular shaped luminaire, the light sources 3 may extend along a straight line. Whereas in the case of a curved or flexible LED strip the light sources 3 may not necessarily extend along a straight line, this line may be curved.

The linear lighting device 4 may additionally comprise one or more sensor for sensing the position, shape and/or orientation of the linear lighting device 4 in the environment 2. That is, sensor(s) of the linear lighting device 4 output a respective sensor output signal which is indicative of the position, shape and/or orientation of the linear lighting device 4. The sensor(s) of the linear lighting device 4 may comprise for example an inertial sensor (e.g. a gyroscope, an accelerometer, and/or a magnetometer), an Anisotropic MagnetoResistance (AMR) sensor, and/or an image sensor (e.g. a 2D or 3D/range image sensor). Other types of sensors that may be used for sensing the position and/or orientation of the linear lighting device 4 are well known to persons skilled in the art and are therefore not discussed in detail herein. The sensor(s) may not necessarily be integrated into the linear lighting device 4. In particular the sensor(s) may be integrated into a separate device in the environment 2 that is able to communicate with the communication device 6. For example the sensor(s) may comprise an image sensor positioned such that the linear lighting device 4 is in the field of view of the image sensor to enable the image sensor to capture image data that can be used to detect the position, shape and/or orientation of the linear lighting device 4.

The lighting system further comprises a communication device 6, such as wall-mounted control panel, or a user terminal such as a smart phone, tablet, television or laptop) installed with a suitable control application 5 ("app").

In order to enable the user 8 to control the lighting through the communication device 6, the communication device 6 is equipped to communicate with the linear lighting device 4 and at least to send control signals to the linear lighting device 4 (directly or indirectly). The communication device 6 may optionally be equipped to receive signals (e.g. sensor output signal(s)) that are transmitted from the linear lighting device 4.

In the embodiment illustrated in FIG. 1a, the communication is implemented via a direct connection 10 between the communication device 6 and the linear lighting device 4, which in this context means without the involvement of an intermediate control device of the lighting system such as a lighting bridge. This connection 10 between the communication device 6 and the linear lighting device 4 may comprise a wired connection, e.g. via an Ethernet, DALI, 0/1-10V or DMX network; and/or wireless connection, e.g. via a short-range RF technology such as Wi-Fi, ZigBee or Bluetooth. For instance, in the case of Wi-Fi, the connection 10 may be via a local Wi-Fi network and hence via a Wi-Fi router disposed in the environment 2 (not shown); or in the case of ZigBee or Bluetooth, the connection 10 may not involve any intermediate router, and may instead for example be based on a mesh network or ad-hoc connection with the linear lighting device 4.

In contrast with FIG. 1*a*, in the example of FIG. 1*b*, the lighting system does comprise a central control device 12 via which the communication and control is implemented. In the case of a lighting network, this may be referred to as a lighting bridge or just the bridge (without necessarily imply any other limitations that may be associated with the term bridge in the context of other types of network). In the context of the present disclosure the term bridge means that the central control device 12 may translate between network protocols (e.g. Ethernet to Zigbee), this is described in more detail below. In this case, in order to effect control, the communication device 6 sends control signals to the bridge 12 over a first connection 14, and the bridge sends corresponding control signals to the linear lighting device 4 over a second connection 16. The linear lighting device 4 may optionally also send signals back to the bridge 12 over the second connection 16, and the bridge may send corresponding signals back to the communication device 6 over the first connection 14. The first and second connections 14, 16 may take the same form or different forms, and each may take any of the forms discussed in relation to the direct connection 10 in FIG. 1*a* e.g. in one example both the first and second connections 14, 16 are via the same local wireless technology such as Wi-Fi or ZigBee; or in another example, such as in the case of a mobile communication device 6 but a wired lighting infrastructure, the first connection 14 (between communication device 6 and bridge 12) may be via a local wireless technology such as Wi-Fi or ZigBee, whilst the second connection 16 (between bridge 12 and luminaire(s)) may be via a wired network such as an Ethernet or DMX network.

Note also that the signals over the second connection 16 may be communicated according to the same format, protocol and/or standard as the signals over the first connection 14; or according to a different format, protocol and/or standard. It will therefore be appreciated that where it is said herein that a given signal is communicated from one element to another, or the like, this means the underlying content or meaning is communicated, and does not necessarily limit to the same form of signal being used throughout the communication.

Figure 2:
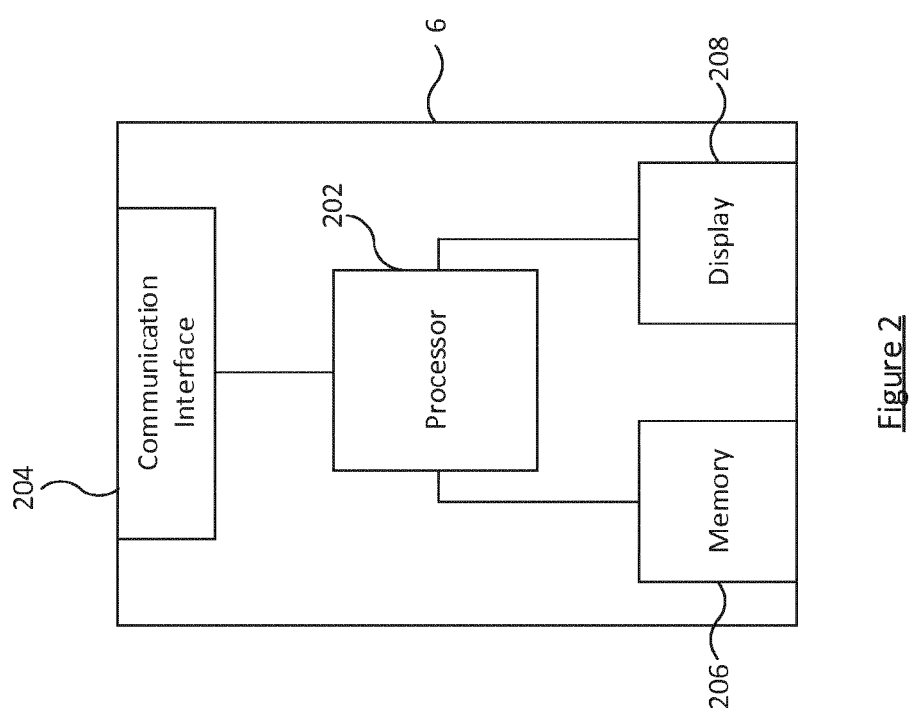
FIG. 2 illustrates a schematic diagram of a communication device.

Reference is now made to the communication device 6 which is illustrated in FIG. 2.

As shown in FIG. 2, the communication device 6 comprises a processor 202 (e.g. a micro-controller, a microchip, circuitry etc.) which is coupled (directly or indirectly) to a communication interface 204, a memory 206, and a display 208 (which may for example be a touch sensitive). It will be appreciated that the communication device 6 may comprise other components not shown in FIG. 2.

The communication interface 204, facilitates communication with the linear lighting device 4.

The communication device 6 may communicate with the linear lighting device 4 via a wireless connection, in which case the interface 106 comprises a wireless communications interface e.g. a wireless interface such as Wi-Fi, Zigbee, Bluetooth or other short-range radio frequency (RF) wireless access technology interface. Alternatively or additionally, the communication device 6 may communicate with the linear lighting device 4 via a wired connection e.g. via an Ethernet or DMX network, in which case the interface 106 comprises a wired communications interface. Examples of wired and wireless communication interfaces are well known to persons skilled in the art and are therefore not discussed in detail herein.

The communication device 6 is installed with a lighting control software application 5, in that the lighting control software application 5 is stored in the memory 206 and arranged for execution on the processor 202.

The lighting control software application 5 provides a user interface which is displayed on the display 208 of the communication device 6. The lighting control software application 5 presents information to, and receives information from the user 8 of the communication device 6, via the user interface.

Various user studies have shown that to end-users, images are an intuitive basis for atmosphere creation, especially for the control of so-called atmosphere creation lighting devices which are capable of rendering a variety of colors (e.g. by controlling the hue, saturation and intensity values of RGB LED-based lighting devices). Images often present scenes and landscapes which end-users may want to recreate in their living spaces. The memory 206 stores images that can be used by the user 8 to control the light emitted by the light sources 3 of the linear lighting device 4.

Figure 3:
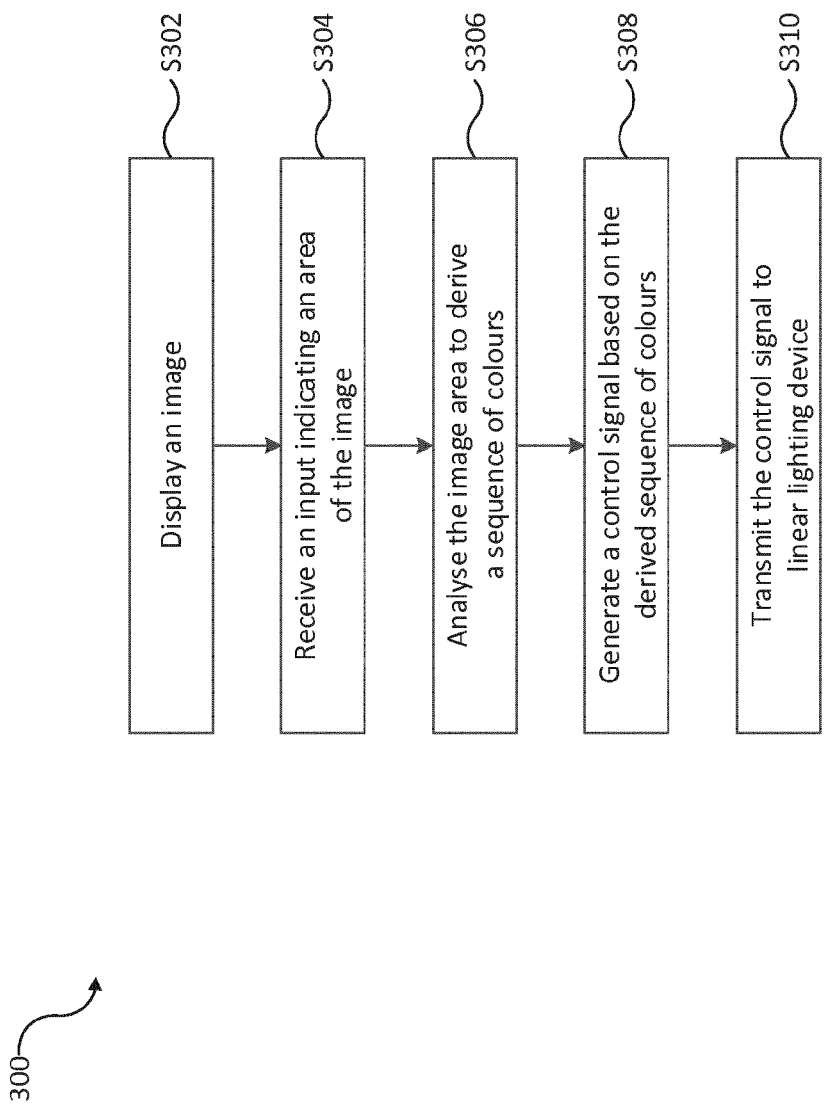
FIG. 3 is a flow chart of a process performed by the communication device for controlling the light emitted by a linear lighting device.

A process 300 implemented by the communication device 6 for controlling the light emitted from the linear lighting device 4 will now be described with reference to the flow chart shown in FIG. 3.

At step S302, the lighting control software application 5 receives a user input to display a color image that is stored in memory 206, and in response to receiving this user input, displays the image on the display 208 of the communication device 6. The user 8 may select the image that is to be displayed by making appropriate selections in the user interface provided by the lighting control software application 5.

At step S304, the lighting control software application 5 receives an input indicating an area of the displayed image. This area is used by the lighting control software application 5 to extract a sequence of colors from the displayed image.

This input may be a user input made by the user 8. The area may be the whole area of the displayed image, in which case the user input corresponds to merely the selection of an image to form the basis for the light effect (steps S302 and S304 are combined).

Alternatively the area may be a segment of the image displayed at step S302, the segment having a smaller area than the area of the image displayed at step S302.

The user 8 may interact with the lighting control software application 5 in various ways to select the segment.

For example, the user 8 may indicate the segment of the image by zooming in on the image, whereby only the segment of the image that remains visible on the display 208 becomes selected. In this example, the user input received at step S304 is a zoom instruction to zoom in on the segment of the image.

In another example the user 8 may draw a line on top of the displayed image to define the segment. In the case of the display 208 being touch sensitive, the user 8 may draw the line by touching the display (which is displaying the image) with their finger (or other object such as a stylus) and dragging their finger (or other object) over the surface of the display 208. Alternatively, if a straight line is desired, the user 8 may simply indicate a desired begin and end point of the line. In this example, the user input received at step S304 is an instruction to draw a line on the displayed image to define the segment of the image.

In yet another example, the user 8 may position an icon graphically representing the linear lighting device 4 on top of the displayed image to define the segment. In this example, the user input received at step S304 is an instruction to position the icon over the segment of the image.

The user 8 may select to position the icon on top of the displayed image by making appropriate selections in the user interface provided by the lighting control software application 5. In response to this selection the lighting control software application 5 may display the icon in a default position on top of the displayed image. The default position may for example be in the center of the image. The user 8 can then simply move the icon on top of the image in order to select a desired region of the image as basis for the color extraction. In the case of the display 208 being touch sensitive, known principles of multi-touch interaction can be applied. For instance, a single-finger touch can be used to move the icon around, double-finger touch-and-rotate to change the icon's orientation, and double-finger pinch to resize the width or height of the icon.

In other embodiments, the input received at step S304 is not a user input. In embodiments whereby the linear lighting device 4 comprises one or more sensor for sensing the position, shape and/or orientation of the linear lighting device 4 in the environment 2, the communication device 6 is able to receive, via the communication interface 204, the one or more sensor output signal that is transmitted from the linear lighting device 4 to the communication device 6 at step S304.

Figure 4B:
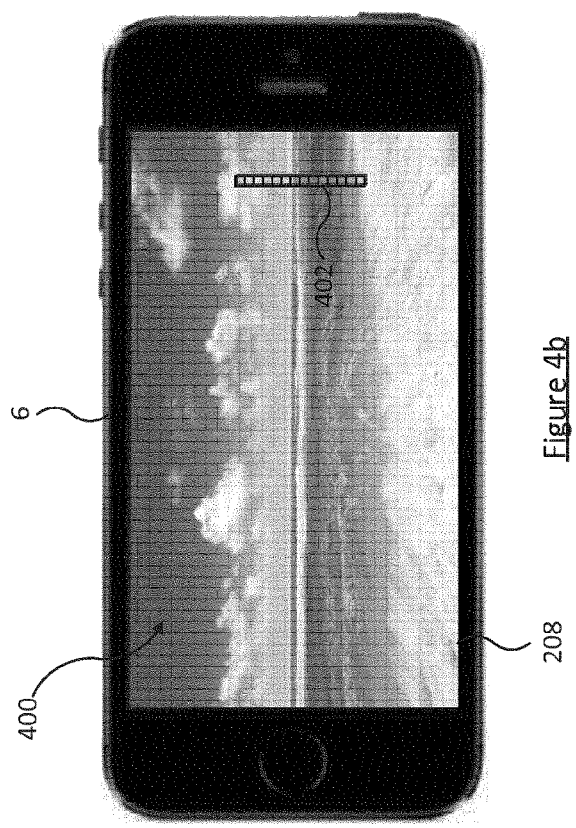
FIGS. 4a and 4b illustrate an icon representative of the linear lighting device being displayed on top of an image on a display of the communication device.
Figure 4A:
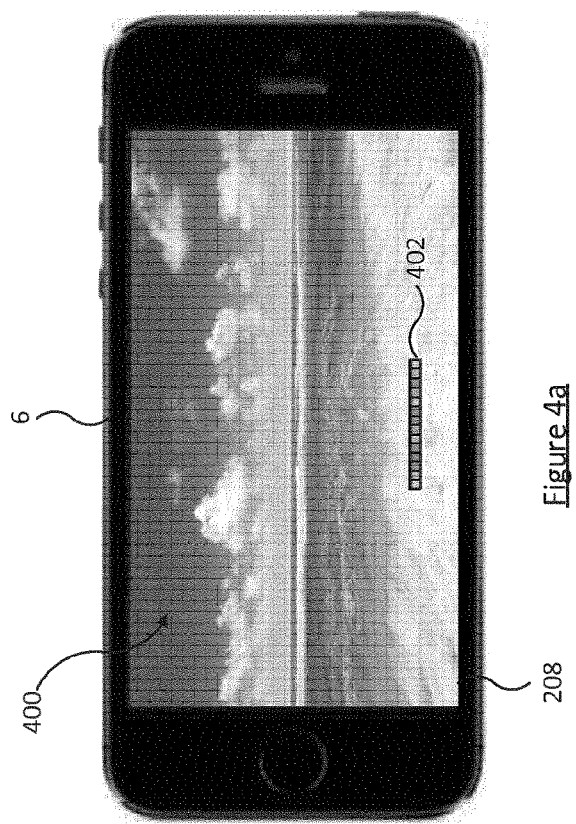

That is, in response to receiving sensor output signals indicative of the position and orientation of the linear lighting device 4, the lighting control software application 5 may use the sensor output signals to generate a default position and orientation of the icon that is displayed on top of the image. For example, a horizontal linear lighting device 4 close to the floor of a room would be represented by a horizontal icon 402 on top of the image which is positioned on the bottom part of the image 400, this is illustrated in FIG. 4*a*. In another example, a vertical linear lighting device 4 positioned halfway up a wall of a room would be represented by a vertical icon 402 on top of the image which is positioned in the middle part of the image 400, this is illustrated in FIG. 4*b*.

Similarly, in response to receiving a sensor output signal that is indicative of the shape of the linear lighting device 4, the lighting control software application 5 may use this sensor output signal to influence the shape of the icon representing the linear lighting device 4. For example, a flexible linear lighting device 4 that has been positioned to form a circle would be represented by a circle icon 402 on top of the image.

In other embodiments, the lighting control software application 5 may receive a signal comprising an identifier (e.g. manufacturer, model no., version no., number of light sources, distribution of light sources etc.) of the linear lighting device 4, and the lighting control software application 5 may use this identifier to influence the shape of the icon representing the linear lighting device 4. The signal comprising the identifier may be a data signal transmitted over connection 10 or connections 14 and 16, and received at the communication device 6 via communication interface 204. Alternatively the signal comprising the identifier may be a light signal emitted from one or more of the plurality of light sources 3. Using coded light techniques the identifier may be modulated into the light (time-varying optical signal) emitted by a light source of the linear lighting device 4. In this way identifier may be said to be embedded into the light emitted from the light source. The communication device 6 may comprise a light detector, (such as a camera, a photoelectric sensor, an image sensor for receiving the light signal), thereby allowing the lighting control software application 5 to identify the linear lighting device 4 upon reception of the identifier.

Once the lighting control software application 5 displays the icon on top of the displayed image at the default position using the sensor output signals, the user 8 may elect to keep the icon at the default position to derive a sequence of colors for rendering on the linear lighting device 4.

Alternatively, the user 8 may move the icon displayed on top of the image from the default position in order to select a desired region of the image as basis for the color extraction. In this example it can be seen that the lighting control software application 5 uses the sensor output signal(s) to optimally support the user in the interaction with the icon.

At step S306, the lighting control software application 5 analyses the selected area of the image to derive a sequence of colors. This can be done in various ways.

For example, for controlling the light emitted from a linear lighting device 4 having N light sources 3, the lighting control software application 5 may divide the selected area of the image into N adjacent sub-portions, each sub-portion comprising one or more pixel of the image, and for each of the N sub-portions determine a mean color value (e.g. a RGB color value) of the pixel(s) in the sub-portion. When a sub-portion is a single pixel, the color value determined can be the color value of the pixel. As such, analyzing the image area to derive a sequence of colors can comprise extracting the color value and/or intensity value of one or more pixels in the image area, and to derive a sequence of colors based on the extracted color value and/or intensity value. For example, the image area can comprise the same number of pixels as the number of controllable light sources in the linear lighting device. A first light source is then controlled based on the color of a first pixel in the image area, a second light source based on a second pixel in the image area, etc. The order of colors of the pixels in the image area can be the same as the order of colors of the light emitted by the light sources, yet this is not required. As a further example, the image area can comprise more pixels than there are light sources in the linear lighting device and the color value of only certain pixels is extracted (e.g. all pixels up until a color value for all light sources has been extracted; every second pixel; or the pixels with the highest intensity). As yet a further example, the image area can comprise fewer pixels than there are light sources in the linear lighting device and the color value of certain pixels is extracted to control multiple light sources of the linear lighting device. Thus the lighting control software application 5 determines a sequence of color values.

In another example, the lighting control software application 5 may perform image processing on the image to downscale the image to a limited number of pixels, e.g. to a size in which the number of pixels in the image matches the number of target light sources 3, then take the color values from the individual pixels in the low-res image to assign to the lighting sources 3.

In embodiments of the present disclosure the goal is not to render part of an image, as such the color selection implemented by the lighting control software application 5 at step S306 does not have to represent the selected area of the image, however the color selection should match the selected area of the image. That is, when a segment selection is made in the image, the colors rendered by the linear lighting device 4 are based on this, yet these colors could be different from the actual pixel values in the selected segment of the image.

At step S308 the lighting control software application 5 generating a control signal based on the sequence of colors derived at step S306.

The lighting control software application 5 may generate the control signal such that the sequence of colors derived at step S306 is mapped linearly to the plurality of light sources 3. For example, consider a linear lighting device 4 whereby each of the light sources are denoted a number such that light source 1 is adjacent to light source 2, light source 2 is adjacent to light sources 1 and 3, and light source 3 is adjacent to light sources 2 and 34, and so on, in accordance with linear mapping the color of a first sub-portion is mapped to light source 1, the color of a second sub-portion (adjacent to the first sub-portion) is mapped to light source 2, and so on such that the color of five adjacent sub-portions 1-5 are rendered on the five adjacent light sources (e.g. light sources 1-5).

Alternatively, the mapping of the sequence of color values to the linear lighting device 4 that is implemented by the lighting control software application 5 may be non-linear. The term "non-linear" is used herein to refer to the fact that a color sequence is rendered by the lighting control software application 5 without keeping an exact spatial distribution of the colors. So the color segments that are larger in the displayed image do not necessarily create a larger light effect, or are being rendered by more light sources 3. It is possible that only a dominant color sequence is derived from the image and rendered on the linear lighting device 4, without taking into account the sizes for those individual color segments in the displayed image. The lighting control software application 5 may generate the control signal such that the sequence of colors derived at step S306 is mapped non-linearly to the plurality of light sources 3 based on predetermined criteria. For example, the lighting control software application 5 may generate a control signal to render the colors of five non adjacent sub-portions of the image (e.g. sub portions 1, 3, 5, 6, 9) onto the five adjacent light sources (e.g. light sources 1-5), to provide a more pleasant color pattern. Similarly, the lighting control software application 5 may generate a control signal to render the colors of five adjacent sub-portions of the image (e.g. sub portions 1-5) onto five non adjacent light sources, to provide a more pleasant color pattern. In embodiments whereby the mapping of the sequence of color values to the linear lighting device 4 is non-linear, the sequence of colors derived at step S306 remains intact.

At step S310 the lighting control software application 5 transmits the control signal generated at step S308 to the linear lighting device 4 to control the plurality of light sources 3 to emit light in accordance with the sequence of colors.

It will be appreciated from the above that embodiments of the present disclosure allows the user 8 to control the linear lighting device 4 to emit light in accordance with a static lighting effect based on a single sequence of derived color values.

Embodiments of the present disclosure also enable the user to control the linear lighting device 4 to emit light in accordance with a dynamic lighting effect. This will now be described in more detail below.

In embodiments in which an icon 402 representing the linear lighting device 4 is displayed on top of the displayed image to define the segment, it is possible for the user 8 to generate dynamic effects by moving the icon 402 over the displayed image. In these embodiments the icon 402 acts as a "moving color scanning line".

Figure 4D:
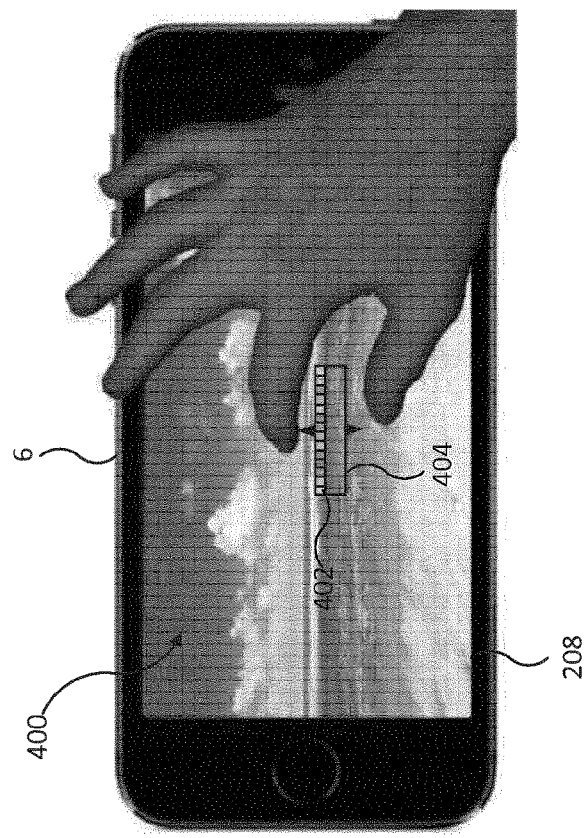
FIG. 4d illustrates how a user may define an image area in which the icon may move to define a dynamic light effect.
Figure 4C:
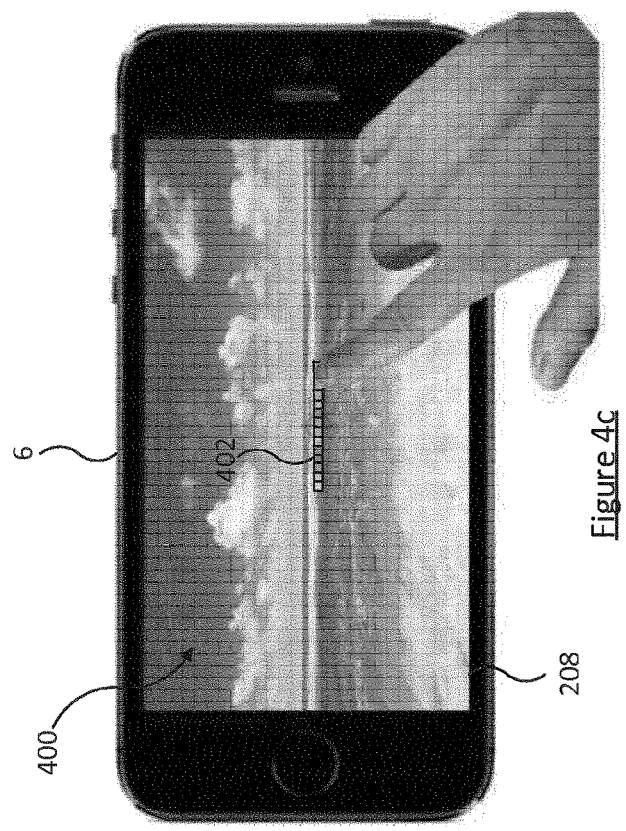
FIG. 4c illustrates how a user may move the icon to define a dynamic light effect.

As illustrated in FIG. 4c, in the case of the display 208 being touch sensitive, the user 8 may move the icon by touching the area of the display which is displaying the icon with their finger (or other object such as a stylus) and dragging their finger (or other object) over the display. That is, by making a touch gesture the user 8 may indicate the direction and speed with which the icon 402 moves over the image. The touch gesture can be a simple drag or swipe action which moves the icon 402 over the image content.

For instance, for generating control data for a horizontally orientated linear lighting device 4, the user 8 may simply move the horizontal representation (i.e. icon) of the linear lighting device 4 vertically across the displayed image (e.g. moving the icon up/down over one or more rows of pixels of the displayed image). For generating control data for a vertically orientated linear lighting device 4, the user 8 may simply move the vertical representation (i.e. icon) of the linear lighting device 4 horizontally across the displayed image (e.g. moving the icon left/right over one or more columns of pixels of the displayed image). It will be appreciated that these example movements are only used to illustrate the concept and the user 8 may move the icon in any direction(s) they choose.

In this example, as the icon 402 moves over the displayed image, the lighting control software application 5 may be configured to analyze, at a predetermined rate, segments of the image defined by the icon 402 to derive a plurality of sequences of colors which can be used to generate a dynamic lighting effect. That is, the lighting control software application 5 generates a control signal based on the derived plurality of sequences of colors, and transmits the control signal to the linear lighting device 4 to control the plurality of controllable light sources 3 to emit light in accordance with a dynamic lighting effect defined by the plurality of sequences of colors.

To create the dynamic light effect, the lighting control software application 5 may generate a control signal whereby each sequence of colors is derived in isolation i.e. a first sequence of colors is derived from a first segment of the image, a second sequence of colors is derived from a second segment of the image (following movement of the icon 402) and so on. Alternatively, in order to derive a sequence of colors for a particular segment of the image, the lighting control software application 5 may use the color values in the particular segment of the image, and a sequence of colors previously derived for another segment of the image i.e. a first sequence of colors is derived from a first segment of the image, a second sequence of colors is derived from a second segment of the image and the first sequence of colors (following movement of the icon 402) and so on.

The user 8 may draw a sequence of interrupted paths to exclude regions of the image that he doesn't want to be rendered on the linear lighting device 4.

The user 8 may have control over the level of dynamics of the dynamic lighting effect. That is, the lighting control software application 5 may detect a speed at which the user 8 has moved the icon 402 over the displayed image, and translate the detected speed to a speed which is to be used to generate the dynamic lighting effect. For example, if the user slowly drags the icon 402 across the displayed image the lighting control software application 5 generates a control signal to control the plurality of light sources 3 to slowly cycle through the plurality of derived sequences of colors, whereas if the user quickly drags the icon 402 across the displayed image the lighting control software application 5 generates a control signal to control the plurality of light sources 3 to quickly cycle through the plurality of derived sequences of colors.

Once the user 8 has created a path which the icon 402 will move along (e.g. by dragging the icon 402 over the displayed image in a desired trajectory or swiping the linear icon in a particular direction such that it starts to move over the image), the lighting control software application 5 may allow the user 8 to draw one or more image boundary on the image. Upon reaching an image boundary, the lighting control software application 5 may control the icon 402 to bounce back along the path the icon 402 has previously taken.

For example the user 8 may define two parallel horizontal lines as image boundaries within the boundaries of the image and in the example whereby the user 8 moves the icon 402 vertically across the displayed image (e.g. moving the icon up/down over rows of pixels of the displayed image), upon detecting that the icon 402 has reached an image boundary, the lighting control software application 5 controls the icon 402 to bounce back in the direction it came from so that the icon bounces back forth (up and down) between the image boundaries. In another example, the user 8 may define two parallel vertical lines as image boundaries within the boundaries of the image and in the example whereby the user 8 moves the icon 402 horizontally across the displayed image (e.g. moving the icon left/right over rows of pixels of the displayed image), upon detecting that the icon 402 has reached an image boundary, the lighting control software application 5 controls the icon 402 to bounce back in the direction it came from so that the icon bounces back forth (left and right) between the image boundaries.

If no image boundaries within the image are defined by the user 8, upon detecting that the icon 402 has reached a boundary of the image, the lighting control software application 5 may control the icon 402 to bounce back in the direction it came from so that the icon bounces back forth between the boundaries of the image.

As an alternative, the user 8 may define an image area 404 in which the icon 402 may move within to define the dynamic light effect, this is illustrated in FIG. 4*d*.

For example, the user 8 could use a pinch touch gesture to indicate an area perpendicular to the linear icon over which the icon 402 should move to generate the dynamic lighting effect based on derived color sequences from each of the rows of pixels of the displayed image. In this example the lighting control software application 5 would control the icon 402 to move back and forth in the user-defined image area (e.g. a user-defined box around the linear icon). That is upon detecting that the icon 402 has a reached a boundary of the image area 404, the lighting control software application 5 is configured to control the icon 402 to bounce back in the direction it came from.

This movement may happen with a default speed which can be adjusted by the user 8. The user interface provided by the lighting control software application 5 may display an on-screen slider with which the user 8 can adjust to control the speed at which the icon 402 moves with the defined image area 404 and thus control the speed of the dynamic lighting effect.

Alternatively, the user 8 can control the speed of the dynamic lighting effect by making a touch gesture inside the defined image area 404. The lighting control software application 5 may detect a speed of the touch gesture and translate the detected speed to a speed which is to be used to generate the dynamic lighting effect. For example, if the user 8 makes a slow vertical swipe across the displayed image the lighting control software application 5 generates a control signal to control the plurality of light sources 3 to slowly cycle through the plurality of derived sequences of colors, whereas if the user makes a quick vertical swipe across the displayed image the lighting control software application 5 generates a control signal to control the plurality of light sources 3 to quickly cycle through the plurality of derived sequences of colors.

Thus it can be seen from the above described embodiments that the user 8 is able to specify a specific trajectory or image area from which the system will derive various color sequences as a basis for the dynamic linear lighting effect.

Figure 5C:
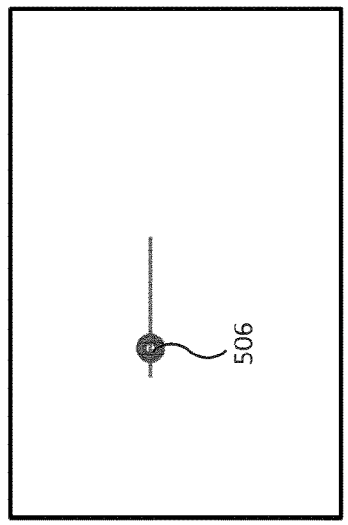
FIGS. 5a-c illustrate various ways that the image area may be defined.
Figure 5B:
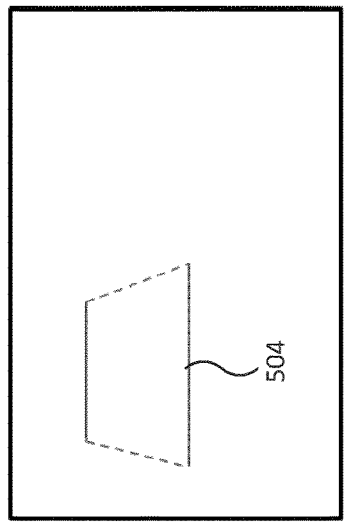
Figure 5A:
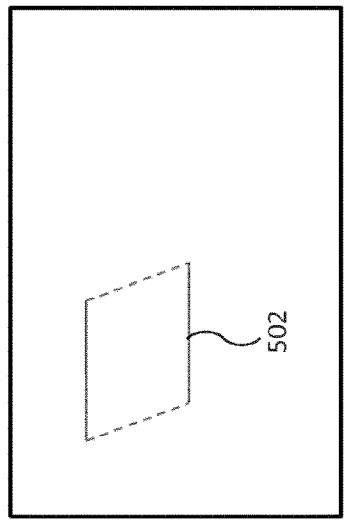

In embodiments, the lighting control software application 5 may give the user 8 more freedom in defining the desired movement of the icon 402. For example, whilst FIG. 4*d* illustrates the user 8 defining a rectangular image area 404 in which the icon 402 may move within to define the dynamic light effect, the image area 404 does not have to be rectangular. As shown in FIG. 5*a*, the user interface provided by the lighting control software application 5 may enable the user 8 to select an image area 502 that is a parallelogram which does not have right angles. As shown in FIG. 5*b*, the user interface provided by the lighting control software application 5 may enable the user 8 to select an image area 504 that does not have a constant length e.g. a trapezoid. As shown in FIG. 5*c*, the user interface provided by the lighting control software application 5 may enable the user 8 to define a pivot point 506. It will be appreciated that the user 8 may be able to interact with the lighting control software application 5 to define other shape image areas than those discussed herein.

In further embodiments the linear lighting device 4 itself can be moved in the environment 2 by the user 8 as a means to program the desired dynamics or desired movements of the icon over the image displayed on the communication device 6.

As described above the linear lighting device 4 may be portable, for example the linear light device may be a wireless, chargeable linear lightstick which may be picked up from its charging base by the user and moved around by the user in a specific direction or trajectory over time. In response to receiving sensor output signals indicative of the position and orientation of the linear lighting device 4, the lighting control software application 5 may use the sensor output signals to detect the trajectory of the movement of the linear lighting device 4 and use this as an input to move the icon over the displayed image. The user interface provided by the lighting control software application 5 may display to the user 8 how they have moved the icon across the displayed image by moving the portable linear lighting device 4. This gives the user feedback on the programmed lighting dynamics.

The lighting control software application 5 may be configured to detect when the movements of the portable linear lighting device 4 by the user take the icon beyond the boundaries of the displayed image, and provide a notification to the user based on this detection. The notification may be provided by the lighting control software application 5 when the movements of the portable linear lighting device 4 by the user move the icon such that it hits or crosses a boundary of the image. The notification provided by the lighting control software application 5 may be a visual notification e.g. the user interface provided by the lighting control software application 5 may provide the visual notification. Alternatively or additionally, the notification provided by the lighting control software application 5 may be an audible notification, e.g. the lighting control software application 5 may control an audio output device (e.g. speaker) of the communication device to provide the auditory feedback.

It can be seen from the above that embodiments of the present disclosure enable a user to easily create and control lighting content for the linear lighting device 4 whilst keeping the user interaction simple for the end-user.

It will be appreciated the above embodiments have been described only by way of example.

Whilst embodiments have been described with reference to the user 8 interacting with the lighting control software application 5 via a touch sensitive display, this is merely an example. The user 8 may interact with the user interface provided by the lighting control software application 5 using a computer mouse, keypad, touchpad, a microphone (for receiving an auditory input) or any other input device.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors. Storage media suitable for storing computer program instructions include all forms of non-volatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet. Any reference signs in the claims should not be construed as limiting the scope.

The invention claimed is:

1. A method for controlling light emitted from a linear lighting device comprising a plurality of linearly distributed controllable light sources, the method comprising:
   displaying an image on a display of a communication device;
   receiving an input which comprises an instruction, from a user, to position a graphical representation of the linear lighting device over a segment of the image;
   analyzing the segment of the image to derive a sequence of colors;
   generating a control signal based on the derived sequence of colors, such that the derived sequence of colors is mapped to the plurality of linearly distributed controllable light sources; and
   transmitting the control signal to the linear lighting device to control the plurality of linearly distributed controllable light sources to emit light in accordance with the derived sequence of colors,
   wherein the received input comprises at least one sensor output signal indicative of one or more of a position of the linear lighting device in an environment, a shape of the linear lighting device or an orientation of the linear lighting device; and
   wherein the positioning a graphical representation of the linear lighting device over said segment of the image is dependent upon said position, shape and/or orientation.

2. The method of claim 1, wherein the method further comprises:
   moving the graphical representation of the linear lighting device over the displayed image;
   during said movement, analyzing segments of the image defined by the graphical representation of the linear lighting device to derive a plurality of sequences of colors;
   generating a control signal based on the derived plurality of sequences of colors; and
   transmitting the control signal to the linear lighting device to control the plurality of controllable light sources to emit light in accordance with a dynamic lighting effect defined by the plurality of sequences of colors.

3. The method of claim 2, wherein the method further comprises moving the graphical representation of the linear lighting device over the displayed image in response to a user input.

4. The method of claim 3, wherein the method further comprises detecting movement of the linear lighting device based on at least one sensor output signal received from the linear lighting device, and moving the graphical representation of the linear lighting device over the displayed image in response to the detected movement.

5. The method of claim 2, wherein the method further comprises detecting a speed of said movement of the linear lighting device, and generating the control signal based on the detected speed to control a speed of the dynamic lighting effect.

6. The method of claim 2, wherein the method further comprises receiving an indication of a user-defined image area, and limiting said movement of the graphical representation of the linear lighting device to within said user-defined image area.

7. A device for controlling light emitted from a linear lighting device comprising a plurality of linearly distributed controllable light sources, the device comprising:
   a communications interface;
   a display; and
   one or more processors configured to run a lighting control application, wherein the lighting control application is configured to:
   display an image on the display;
   receive an input which comprises and instruction, from a user, to position a graphical representation of the linear lighting device over a segment of the image;
   analyze the segment of the image to derive a sequence of colors;

generate a control signal based on the derived sequence of colors, such that the derived sequence of colors is mapped to the plurality of linearly distributed controllable light sources; and transmit the control signal via the communication interface to the linear lighting device to control the plurality of linearly distributed controllable light sources to emit light in accordance with the derived sequence of colors, wherein the received input comprises at least one sensor output signal indicative of one or more of a position of the linear lighting device in an environment, a shape of the linear lighting device or an orientation of the linear lighting device; and wherein the positioning a graphical representation of the linear lighting device over said segment of the image is dependent upon said position, shape and/or orientation.

8. A computer program product for controlling light emitted from a linear lighting device comprising a plurality of linearly distributed controllable light sources, the computer program product comprising code embodied on a computer-readable medium and being configured so as when executed on one or more processors to perform the steps of:

displaying an image on a display of the communication device;

receiving an input which comprises an instruction, from a user, to position a graphical representation of the linear lighting device over said segment of the image;

analyzing the image area to derive a sequence of colors;

generating a control signal based on the derived sequence of colors, such that the derived sequence of colors is mapped to the plurality of linearly distributed controllable light sources; and transmitting the control signal to the linear lighting device to control the plurality of linearly distributed controllable light sources to emit light in accordance with the derived sequence of colors, wherein the received input comprises at least one sensor output signal indicative of one or more of a position of the linear lighting device in an environment, a shape of the linear lighting device or an orientation of the linear lighting device; and wherein the positioning a graphical representation of the linear lighting device over said segment of the image is dependent upon said position, shape and/or orientation.

* * * * *